Dec. 8, 1970 C. F. KURTH 3,546,702

PHASE LOCKED LOOP BILATERAL TRANSMISSION SYSTEM INCLUDING AUTOMATIC GAIN CONTROL

Filed Dec. 27, 1967 2 Sheets-Sheet 1

INVENTOR
C. F. KURTH
BY R. B. Ardis
ATTORNEY

United States Patent Office 3,546,702

Patented Dec. 8, 1970

3,546,702

PHASE LOCKED LOOP BILATERAL TRANSMISSION SYSTEM INCLUDING AUTOMATIC GAIN CONTROL

Carl F. Kurth, Andover, Mass., assignor to Bell Telephone Laboratories, Incorporated, Murray Hill and Berkeley Heights, N.J., a corporation of New York Filed Dec. 27, 1967, Ser. No. 693,905
Int. Cl. H04b 1/58, 3/04
U.S. Cl. 343—179 9 Claims

ABSTRACT OF THE DISCLOSURE

An FM bilateral transmission system is disclosed which includes a first transceiver at one end comprising a phase locked loop and a second transciever at the other end connected by a lossy transmission medium. The second transceiver comprises a phase locked loop and an automatic gain control circuit to compensate for attenuation suffered in the transmission medium by the frequency modulated carrier.

CROSS REFERENCES TO RELATED APPLICATIONS

The following are related applications: W. B. Gaunt, Jr., Ser. No. 678,398, filed Oct. 26, 1967; C. F. Kurth, Ser. No. 693,904, filed Dec. 27, 1967; C. F. Kurth-F. J. Witt, Ser. No. 694,012, filed Dec. 27, 1967; C F. Kurth-R. C. MacLean, Ser. No. 693,967, filed Dec. 27, 1967; C. F. Kurth, Ser. No. 693,906, filed Dec. 27, 1967; C. F. Kurth, Ser. No. 693,922, filed Dec. 27, 1967.

BACKGROUND OF THE INVENTION

This invention relates generally to bilateral transmission systems and, more particularly, to bilateral transmission systems employing a transceiver at each end comprising a phase locked loop connected by a lossy transmission medium.

A frequency modulated bilateral transmission system employing a transceiver at each end comprising a phase locked loop has been set forth in an application by W. B. Gaunt, Jr., Ser. No. 678,398, filed Oct. 26, 1967. The bilateral transmission system disclosed therein may be utilized where the attenuation suffered by the modulated carrier in the transmission medium is negligible. When significant attenuation is suffered by the modulated carrier in the transmission medium, the operation of the bilateral transmission system is impaired. This impairment primarily is caused by the amplitude dependence of the phase locked loop and the consequential change of its loop gain. Where a bilateral transmission system including phase locked loops is to be employed in a medium in which there will be significant attenuation, the amplitude dependence of the bilateral transmission system may be minimized by compensating for the attenuation suffered in the transmission medium.

The present invention, although not limited to such an application, may be used for telephone transmission. At present, there is an increasing demand for additional telephones in areas in which there are already overcrowded telephone lines. These telephone lines extend from a central office to individual subscribers served by the central office. When it is unfeasible to install additional lines in these areas, carrier transmission employing pre-existing lines may be employed. Carrier transmission may also be employed in remote areas if telephone lines exist since they can be used for the modulated carrier. The telephone lines may introduce significant attenuation to a modulated carrier passing therethrough, and the prior Gaunt system may be incapable of accurate operation for this suggested application.

The bilateral transmission system comprising a transceiver at each end employing a phase locked loop may be employed between a central office and a subscriber. A separate phase locked loop may be installed at the central office corresponding to a phase locked loop for each subscriber. Since the distance between the central office and each subscriber may vary, the attenuation suffered by a modulated carrier passing through the line will also vary. This variation may be compensated for at the time of installation by auxiliary equipment and complex installation procedures. It would be preferable, though, to provide a telephone receiver which automatically compensates for the attenuation suffered by the modulated carrier in the transmission line.

A phase locked loop includes a voltage controlled oscillator and a phase comparator. The output of the voltage controlled oscillator is phase compared with the modulated carrier received by the phase locked loop. The phase comparator produces an output proportional to the phase difference between the compared signals which is fed to the voltage controlled oscillator to adjust the frequency of its output.

The phase comparator functionally multiplies the signals it compares, and thus, is amplitude sensitive. In order to maintain the loop gain of the phase locked loop relatively constant for accurate operation, it would be desirable to minimize the inaccuracies of the base locked loop operation due to amplitude attenuation in the transmission medium. It would be desirable to maintain the loop gain of the phase locked loop relatively constant and relatively independent of the attenuation suffered by the modulated carrier in the transmission medium.

An object of the present invention is to provide a transceiver comprising a phase locked loop which automatically compensates for attenuation suffered by a received modulated carrier in the transmission medium.

Another object of the present invention is to maintain the loop gain of a phase locked loop serving as a transceiver relatively independent of the attenuation suffered by a modulated carrier in the transmission medium.

Still another object of the present invention is to provide a bilateral transmission system employing a transceiver at each end comprising a phase locked loop where the transmission medium introduces significant attenuation to the modulated carrier passing therethrough.

Another object of the present invention is to provide a bilateral transmission system comprising a transceiver at each end employing a phase locked loop interconnected by a lossy transmission medium where the loop gains of the phase locked loops are relatively independent of the attenuation suffered in the transmission medium.

SUMMARY OF THE INVENTION

The above objects are accomplished by providing a transceiver comprising an oscillator which provides a carrier wave to be modulated by a signal to be transmitted by the transceiver, a phase comparator producing an output having sum and difference components after comparing the output of the oscillator with the modulated carrier received by the transceiver, an amplifier supplied by the phase comparator, and, in accordance with one feature of the present invention, means responsive to one component of the output of the phase comparator to control the gain of the amplifier.

In accordance with an additional feature of the present invention, a bilateral transmission system is provided employing a transceiver at one end comprising a standard phase locked loop and a second transceiver at the other comprising a phase locked loop and an automatic gain control circuit. The second transceiver includes a phase comparator and a voltage controlled oscillator, as does the standard phase locked loop. The signal received by the second transceiver is compared with the output of its voltage controlled oscillator. The phase comparator produces an output which is dependent upon the amplitude of the compared signals. Since the phase comparator multiplies the compared signals, its output contains sum and difference components. Although the phase comparator multiplies the compared signals, it is operated in its linear region and thus can be considered a linear phase comparator. While the modulated carrier suffers attenuation in the transmission medium, the carrier also suffers the same amount of attenuation since it passes through the same length of transmission medium as does the modulated carrier. In accordance with another feature of the present invention, the sum component of the output of the phase comparator is used to control the gain of an amplifier which is supplied by the phase comparator. In this manner, the attenuation suffered by the modulated carrier in the transmission medium will be compensated and the loop gain of the phase locked loop will remain substantially constant.

In accordance with still another feature of the present invention, a high pass filter is provided in the automatic gain control circuit in order to pass primarily the attenuated carrier which will control the gain of the amplifier which is supplied by the phase comparator. The auxiliary automatic gain control circuit can compensate for significant attenuation in the transmission medium and enable the bilateral transmission system of the present invention to be used where the transmission medium significantly attenuates a modulated carrier passing therethrough.

DETAILED DESCRIPTION

A frequency modulated bilateral transmission system comprising a transceiver at each end employing a phase locked loop has been described in an application by W. B. Gaunt, Jr., Ser. No. 678,398, filed Oct. 26, 1967. When the modulated carrier in the bilateral transmission system suffers significant attenuation through the transmission medium, its operation may be impaired since the loop gain of the phase locked loop may significantly vary.

Figure 1:
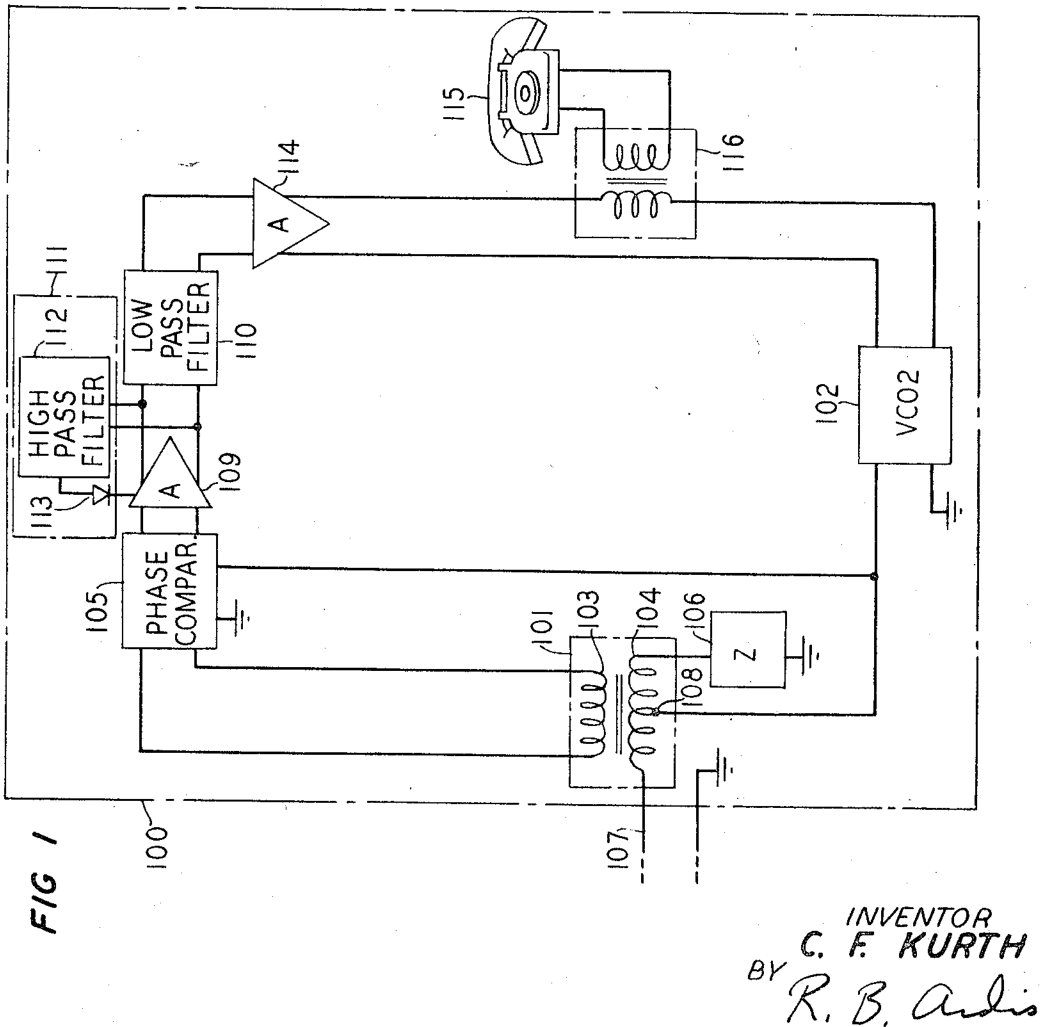
FIG. 1 is a block diagram of a transceiver which, in accordance with the present invention, compensates for attenuation suffered by a modulated carrier through the transmission medium.

FIG. 1 is a block diagram of a transceiver which, in accordance with the present invention, will compensate for attenuation suffered by a modulated carrier in the transmission medium. Compensation for this attenuation enables the loop gain of the transceiver to remain relatively constant despite the attenuation suffered by a modulated carrier in the transmission medium.

Means are provided in transceiver 100 to separate the transmitted and received modulated carrier. Hybrid 101 which is part of transceiver 100 may serve this separation function while insuring that the modulated carrier output of voltage controlled oscillator 102 is transmitted. A voltage controlled oscillator whose frequency output is linearly proportional to its voltage input may be used in the present invention. An example of a voltage controlled oscillator suitable for use in the present invention may be found on p. 67 of "Phaselock Techniques," written by F. M. Gardner and published by John Wiley & Sons, Inc. in 1966. Hybrid 101 consists of primary winding 103 and secondary winding 104. Primary winding 103 is connected to phase comparator 105. One end of secondary winding 104 is connected to terminating impedance 106. The other end of secondary winding 104 is connected to the transmission line 107. The secondary winding 104 is tapped at point 108, which is connected to voltage controlled oscillator 102. Hybrid 101 insures that the output of voltage controlled oscillator 102 received at point 108 is transferred to transmission line 107 and not transferred to primary winding 103. In addition, hybrid 101 insures that the modulated carrier received by transceiver 100 at secondary winding 104 is transferred to the primary winding 103 and not transferred to voltage controlled oscillator 102. Therefore, the hybrid serves to separate the modulated carrier received from that transmitted by transceiver 100.

The modulated carrier received by transceiver 100 is applied to phase comparator 105, as is the output of voltage controlled oscillator 102. Phase comparator 105 multiplies the compared signals and produces an output having sum and difference components. The output of phase comparator 105 is passed through the series connection of amplifier 109 and low pass filter 110.

Automatic gain control circuit 111 is connected to the output of amplifier 109. Automatic gain control circuit 111 includes high pass filter 112 and diode 113. The output of amplifier 109 is connected to the input side of high pass filter 112 while the output of high pass filter 112 is passed through diode 113 and returned to amplifier 109. High pass filter 112 permits only the sum component of the output of phase comparator 105 to be used to control the gain of amplifier 109. The output of low pass filter 110 is connected to amplifier 114, the output of which may be supplied to utilization device 115 through transformer 116. For purposes of illustration, utilization device 115 may be a telephone set which is capable of both transmitting and receiving voice signals. In addition, the output of amplifier 114 is supplied, in part, to voltage controlled oscillator 102.

The operation of transceiver 100 may best be understood with reference to FIG. 1. Transceiver 100 includes phase comparator 105, which produces an output proportional to the phase and frequency difference between the modulated carrier received by transceiver 100 and the output of voltage controlled oscillator 105. When there is a freqeuncy difference, a voltage will be developed at the output of phase comparator 105 which is fed back to voltage controlled oscillator 102 to adjust the output of voltage controlled oscillator 102 so that it is frequency synchronized with the signal received by transcevier 100.

Automatic gain control circuit 111 allows only the sum component of the output of phase comparator 105 to be used to control the gain of amplifier 109. By utilizing the sum component of the output of phase comparator 105 the attenuation suffered in the transmission medium by the modulated carrier may be compensated. Since the carrier has been attenuated as much as the modulated carrier, the sum component which is used to control the gain of amplifier 109 effectively compensates for the attenuation suffered in the transmission medium by the modulated carrier. This compensation permits the loop gain of the transceiver 100 to remain relatively constant despite the attenuation suffered by the modulated carrier in the transmission medium.

Mathematical terminology may serve to more fully explain the operation of transceiver 100. The modulated carrier received by transceiver 100 and transferred to phase comparator 105 by hybrid 101 may be represented by $$\sin(\omega t+\varphi_1) \quad (1)$$

After an initial "lock-in" period where the frequency of the output of voltage controller oscillator 102 becomes synchronized with the frequency of the modified carrier received by transceiver 100, as above described, voltage controlled oscillator 102 produces an output supplied to phase comparator 105, which may be represented as $$\cos(\omega t+\varphi_2 \quad (2)$$

The electrical waves supplied to the phase comparator 207 have equal carrier frequencies of $\omega$ but have different phases. Phase comparator 105 multiples the signals it compares and produces an output which may be represented as $$\frac{1}{2}\sin(\varphi_1-\varphi_{27})+\sin(2\omega t+\varphi_1+\varphi_2) \quad (3)$$

This output is then passed through amplifier 109 and low pass filter 110. The signal represented by the second term of Equation 3 will be suppressed by low pass filter 110. The mathematical description is that of a multiplier, but the phase comparator is operated in its linear region and may be considered a linear phase comparator. Consequently, the output of amplifier 114 is proportional to the phase difference between the signals supplied to phase comparator 105. Since the information in the received modulated carrier is carried in the phase of its modulated carrier, amplifier 114 produces a signal which is proportional to the transmitted information. This output is supplied to utilization device 115 through transformer 116. For purposes of illustration, utilization device 115 is shown to be a telephone transmitter and receiver. In addition, a portion of the output of amplifier 114 is supplied to voltage controlled oscillator 102 as a feedback voltage so that the phase of the output produced by voltage controlled oscillator 102 as a feedback voltage may more nearly equal the phase of the received modulated carrier.

Phase comparator 105 produces an output which is represented by Equation 3. High pass filter 112 will pass the signal represented by the second term of Equation 3 while attenuating the signal represented by the first term. The signal represented by the second term is then rectified and used to control the gain of amplifier 109. The signal represented by the second term of Equation 3 is the carrier plus some phase shift. The carrier has been attenuated in the transmission medium to the same extent as has the modulated carrier and, thus, use of the carrier to control the gain of amplifier 109 will compensate for the attenuation suffered by the modulated carrier in the transmission medium.

Transceiver 100 serves not only as a receiver but also transmits the signal emanating from utilization device 115. Voltage controlled oscillator 102 produces an output whose frequency is determined, in part, by the amplitude of the wave applied to its input. The output of utilization device 115 is applied to voltage controlled oscillator 102 through transformer 116 which will modulate the output of voltage controlled oscillator 102. The modulated carrier produced by voltage controlled oscillator 102 will be transmitted through transmission line 107 after passing through hybrid 101.

Figure 2:
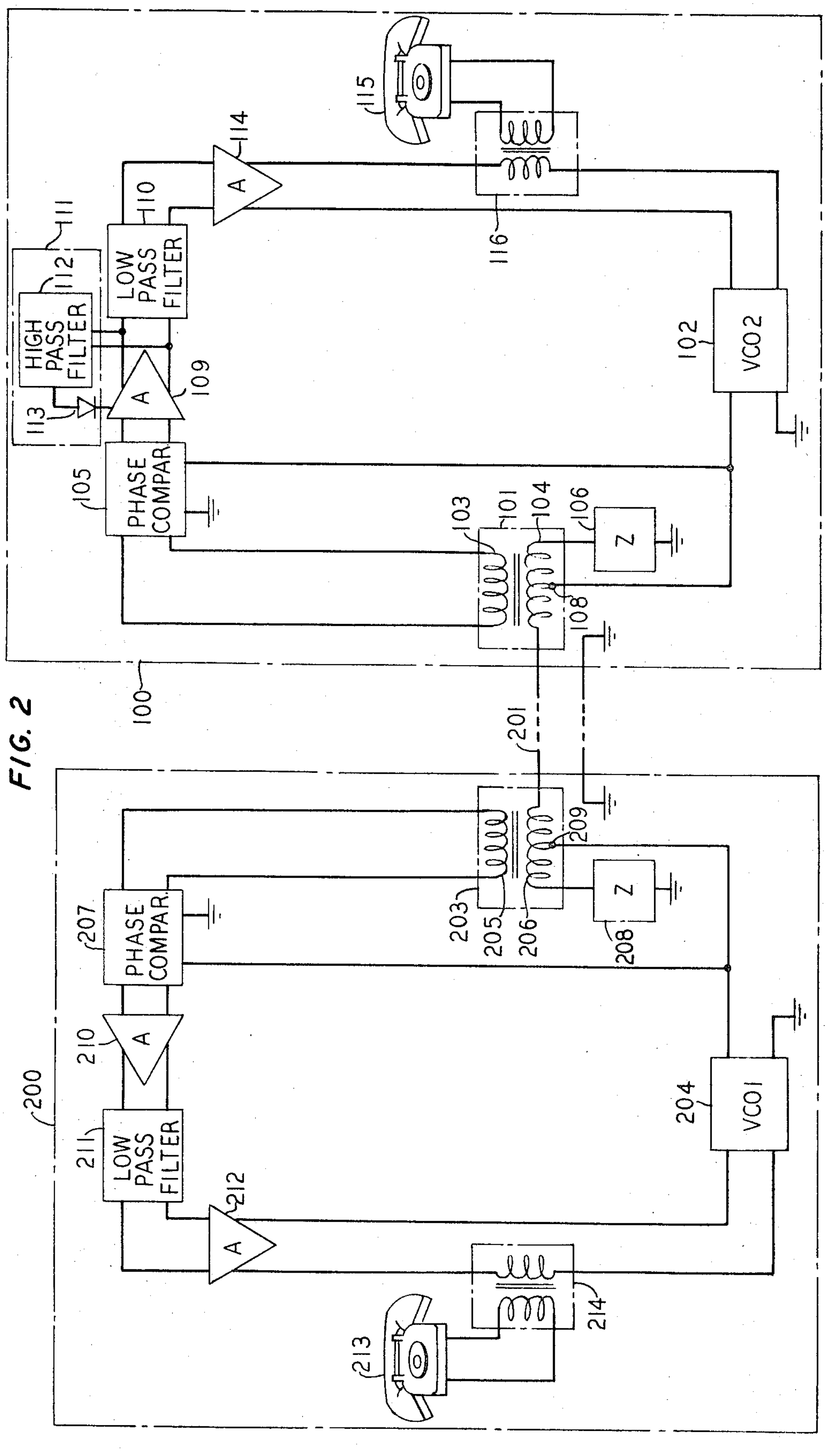
FIG. 2 is a block diagram of a bilateral transmission system employing a phase locked loop at one end and the transceiver of FIG. 1 at the other end to be employed, in accordance with the present invention, in a lossy transmission medium which connects the phase locked loop and the transceiver.

FIG. 2 is a block diagram of a bilateral transmission system comprising a transceiver at each end utilizing the principles of the present invention so that a bilateral transmission system employing essentially phase locked loops at each end may be employed where significant attenuation is suffered by a modulated carrier in the transmission medium which connects the transceivers. The bilateral transmission system comprises phase locked loop 200, transmission line 201, and transceiver 100. Transceiver 100 has been set forth and fully explained in FIG. 1. Therefore, the same numerals are employed in FIG. 2 for transceiver 100 as employed in FIG. 1. Both phase locked loop 200 and transceiver 100 serve as transceivers in that each transmits and reecives a modulated carrier using the same apparatus for both operations.

Since the phase locked loop serves as a transceiver, means are provided to separate the tarnsmitted and received modulated carriers. Hybrid 203, which is part of phase locked loop 200, serves this separation function while insuring that the modulated carrier output of voltage controlled oscillator 204 will be transmitted to transceiver 100. Hybrid 203 consists of primary winding 205 and secondary winding 206. Primary winding 205 is connected to phase comparator 207. One end of secondary winding 206 is connetced to terminating impedance 208. The other end of secondary winding 206 is connected to transmission line 201. The secondary winding 206 is tapped at point 209, which is connected to voltage controlled oscillator 204. Hybrid 203 provides that the output of voltage controlled oscillator 204 received at tapped point 209 is transferred to transmission line 201 while not being transferred to primary winding 205. In addition, hybrid 203 insures that the signal received by phase locked loop 200 at secondary winding 206 is transferred to primary winding 205 while not being transferred to voltage controlled oscillator 204. Therefore, the hybrid serves to separate the modulated carrier received from that tarnsmitted by phase locked loop 200.

The modulated carrier received by phase locked loop 200 is applied to phase comparator 207, as is the output of voltage controlled oscillator 204. The output of phase comparator 207 is passed through the series connection of amplifier 210 and low pass filter 211. The output of low pass filter 211 is connected to amplifier 212, the output of which may be supplied to utilization device 213 through transformer 214. For purposes of illustration, utilization device 213 is shown to be a telephone set which is capable of both transmitting and receiving voice signals. In addition, the output of amplifier 212 may, in part, be supplied to voltage controlled oscillator 204.

The operation of phase locked loop 200 may best be understood with reference to FIG. 2. Phase comparator 207 produces an output which is proportional to the phase and frequency variations between the modulated carrier received by phase locked loop 200 and the output of voltage controlled oscillator 204. If a phase or frequency variation exists, a voltage will be developed at the output of phase comparator 207 which is fed back to voltage controlled oscillator 204 as a D.C. bias to adjust the output of voltage controlled oscillator 204 so that it is frequency synchronized with the signal received by phase locked loop 200. Phase comparator 207 may be operated in its linear region and may be considered a linear phase comparator with regard to its transfer function. The electrical waves supplied to the phase comparator 207 have equal carrier frequencies of $\omega$ but have different phases. Phase comparator 207 multiplies the signals, is compared, and produces an output which may be represented as $$\frac{1}{2}\sin(\varphi_1-\varphi_2)+\frac{1}{2}\sin(2\omega t+\varphi_1+\varphi_2) \quad (4)$$

This output is then passed through ampliler 210 and low pass filter 211. The second term of Equation 4 will be suppressed by low pass filter 211. Consequently, the output of amplifier 212 is proportional to the phase difference between the signals supplied to phase comparator 207. Since the information in the modulated carrier transmitted by transceiver 100 is carried in the phase of its modulated carrier, amplifier 212 produces a signal which is proportional to the transmitted information. This output is supplied to utilization device 213 through transformer 214. In addition, a portion of the output of amplifier 212 is supplied to voltage controlled oscillator 204 as a feedback voltage so that the phase of the output produced by voltage controlled oscillator 204 may more nearly equal the phase of the modulated carrier transmitted by transceiver 100.

Phase locked loop 200 serves not only as a receiver but also transmits the signal emanating from utilization device 213. Voltage controlled oscillator 204 produces an output whose frequency is determined, in part, by the amplitude of the wave applied to the input of the voltage controlled oscillator. Thus, the output of utilization device 213 is applied to voltage controlled oscillator 204 through transformer 214 which will modulate the output of voltage controlled oscillator 204. The modulated carrier produced by voltage controlled oscillator 204 will be transmitted to transceiver 202 through transmission line 201 after passing through hybrid 203.

The operations of transceiver 100 and phase locked loop 200 have been described above considering their use in a bilateral transmission system, such as shown in FIG. 2. Therefore, a detailed description of transceiver 100 and phase locked loop 200 is unnecessary to again be set forth since it merely would be repetitious. The bilateral system shown in FIG. 2 has a single carrier frequency for both directions of transmission since the voltage controlled oscillator 104 in phase locked loop 200 will synchronize with voltage controlled oscillator 102 in transceiver 100. This synchronization primarily results from the feedback properties of the phase locked loop which have been described above.

The system described in FIG. 2 automatically compensates for attenuation encountered in the transmission medium by a modulated carrier. Automatic gain control network 111 in transceiver 100 compensates for the attenuation and no complex adjustments need be made in order to accomplish this compensation. For example. when the bilateral transmission system shown in FIG. 2 is employed in a telephone system, phase locked loop 200 is installed at the central office and transceiver 100 is installed at the subscriber location. No adjustments would be made at the subscriber location in order to have accurate telephone transmission. In addition, it is clear that a large number of bilateral transmission systems may be employed in a telephone system where for each subscriber equipped with a modified phase locked loop, there is a corresponding phase locked loop in the central office. Since the distance between the central office and each subscriber loop may vary, the attenuation suffered by the transmitted modulated carrier will also vary. But since the automatic gain control circuit 111 compensates for a wide range of attenuation, the system described in FIG. 2 is well suited for this application.

Figure 3:
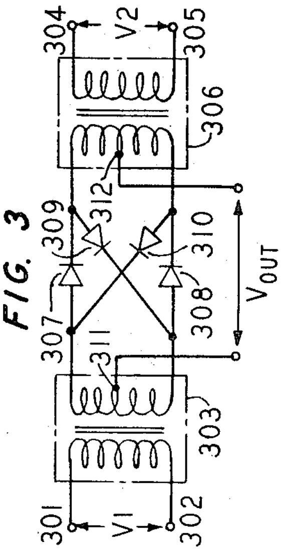
FIG. 3 is a schematic diagram of one type of phase comparator that may be used in the embodiments of the invention shown in FIGS. 1 and 2.

FIG. 3 is a schematic diagram of one type of phase comparator which may be used in embodiments of the present invention shown in FIGS. 1 and 2. A phase comparator which produces an output proportional to the phase difference of the signals is compared by multiplying the compared signals may be used in embodiments of the invention shown in FIGS. 1 and 2. FIG. 3 is a ring modulator which is operated as a phase comparator. V1 which is applied to terminals 301 and 302 of transformer 303 represents the modulated carrier received by phase locked loop 200 or transceiver 100. V2 which is applied to terminals 304 and 305 of transformer 306 represents the output of voltage controlled oscillators 204 or 102. One end of the secondary winding of transformer 303 is connected to one end of the secondary winding of transformer 306 through diode 307, while the other end of the secondary winding of transformer 303 is connected to the other end of the secondary winding of transformer 306 through diode 308. The anode ends of diodes 307 and 308 are connected to the secondary winding of transformer 303, while the cathode ends of diodes 307 and 308 are connected to the secondary winding of transformer 306. Diodes 309 and 310 complete the diode bridge network by having the anode ends of diodes 309 and 310 connected to the secondary winding of transformer 306 and the cathode ends of diodes 309 and 310 connected to the anodes of diodes 308 and 307, respectively. The secondary winding of transformer 303 may be tapped at point 311, while the secondary winding of transformer 306 may be tapped at point 312. The output of the ring demodulator shown in FIG. 3 is brought out from tapped points 311 and 312.

When the frequencies and the phases V1 and V2 are equal, the D.C. component at the output will be zero. For purposes of explanation, assume V1 is positive at terminal 301 and negative at terminal 302 and V2 is positive at terminal 304 and negative at terminal 305. Diodes 307 and 309 will be forward biased, thus completing a circuit path for the secondary winding of transformer 303. Diodes 309 and 308 will also be forward biased, thus completing a circuit path for the secondary winding of transformer 306. By tapping at the same point on the secondary windings of transformers 303 and 306, for example, at midpoints, the voltage difference between tapped point 311 and 312 will be zero. If a phase difference exists between the compared signals, a voltage difference would be produced between tapped points 311 and 312. Similarly, if a frequency difference existed between V1 and V2, the output of the ring demodulator would fluctuate as the phase difference between the compared signals was varying. The ring demodulator in operation serves to multiply the compared signals and produce an output which may be represented by Equations 3 and 4 set forth above.

Figure 4:
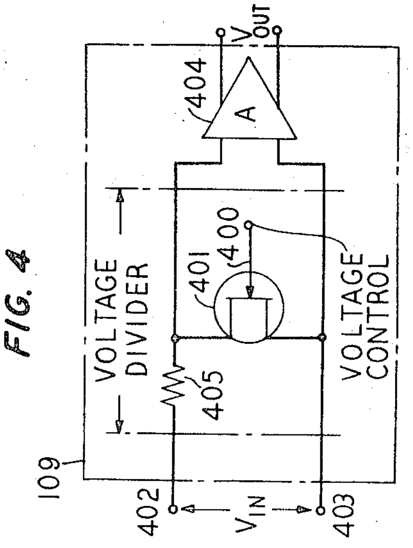
FIG. 4 is a schematic diagram of an embodiment of an automatic gain control circuit which, in accordance with the present invention, may be used in the block diagrams of FIGS. 1 and 2.

FIG. 4 is a schematic diagram of an amplifier whose gain may be controlled in accordance with teachings of the present invention. Numeral 109 is used to identify the amplifier of FIG. 4, since the amplifier of FIG. 4 may be used in FIGS. 1 and 2 as amplifier 109. The rectified sum component supplied by the output of diode 113 is applied to gate electrode 400 of field effect transistor 401 as a voltage control. Field effect transistor 401 has an impedance characteristic from drain to source which varies in response to the voltage applied at terminal 400. The output of phase comparator 105 is supplied to amplifier 109 at terminals 402 and 403 and represented as $V_{in}$, which is passed through a resistance bridge to amplifier 404. The resistance bridge comprises resistor 405 and field effect transistor 401. One end of resistor 405 is connected to terminal 402 to receive the output of phase comparator 105. The other end of resistor 405 is connected to the source terminal of field effect transistor 401 and to one terminal of the input of amplifier 404. The drain terminal of field effect transistor 401 is connected to terminal 403 and to the other input terminal of amplifier 404. The output of amplifier 404 is shown as $V_{out}$ and is supplied to low pass filter 110 and high pass filter 112.

Under control of the sum component the impedance across the drain to the source terminals of field effect transistor 401 will vary. Thus, if the sum component of the output of phase comparator 105 increases, the impedance across the drain to source terminals of field effect transistor 401 decreases, which would decrease the gain of amplifier 109. In this manner, compensation for the attenuation suffered in the transmission medium may be accomplished.

It is to be understood that the embodiments of the invention which have been described are merely illustrative of the application of the principles of the invention. Numerous modifications may readily be devised by those skilled in the art without departing from the spirit and scope of the invention.

What is claimed is:

1. An FM transceiver for simultaneous transmission and reception of modulated carrier waves of substantially the same carrier frequency, said transceiver comprising circuit means for separating the carrier wave to be transmitted from the received carrier, a phase comparator operating in its linear region, means for applying the received carrier to said comparator, an oscillator for providing a carrier wave, means for applying the output of said oscillator to said circuit means and means for applying the output of said oscillator to said phase comparator to produce a comparator output having sum and difference components indicative of the phase relationship of the received carrier and the oscillator output, means responsive to one of the components of the comparator output for controlling the frequency of said oscillator, means for maintaining a substantially constant gain in the loop defined by said comparator and said oscillator comprising amplifier means connected to the output of said comparator, means connected to the output of said amplifier means and responsive to a different one of the components of said comparator output for controlling the gain of said amplifier means, and means connected in series between said phase comparator and said oscillator for extracting a portion of the output of said amplifier means and for introducing modulating signals to said oscillator.

2. Apparatus as set forth in claim 1 wherein said means to control the gain of said amplifier is responsive to the amplitude of said sum component.

3. Apparatus as set forth in claim 1 wherein said means to control the gain of said amplifier comprises a filter for blocking one of said components.

4. Apparatus as set forth in claim 1 wherein said amplifier includes at least one voltage sensitive variable impedance element whose impedance varies in response to the amplitude of one of said components.

5. Apparatus as set forth in claim 1 wherein said oscillator is a voltage controlled oscillator in which the frequency of the output wave of said voltage controlled oscillator is additionally controlled by the amplitude of the signal to be transmitted as a modulated carrier.

6. A bilateral transmission system comprising a transceiver at each end, each of said transceivers comprising a phase locked loop operable at substantially the same carrier frequency, said transceivers being connected by a lossy transmission medium which introduces attenuation to a modulated carrier passing therethrough, each of said phase locked loops comprising an oscillator, a phase comparator, and circuit means for permitting simultaneous transmission to and reception from the other of the phase locked loops of modulated carrier waves, said circuit means including means for separating transmitted carrier waves from received carrier waves, each of said loops including means for applying the output of the oscillator to said circuit means and means for applying the output of the oscillator and received carrier waves to said phase comparator, said phase comparator being operated in its linear region to produce sum and difference components in its output, means for applying one of the components to said oscillator for controlling the frequency thereof, means connected in series between the said phase comparator and said oscillator for extracting the signal information contained in said one of the components and for applying modulating voltage to said oscillator, and means in at least one of said phase locked loops for maintaining the loop gain substantially constant comprising an amplifier connected to the output of the phase comparator and means responsive to the other of said components for controlling the gain of said amplifier.

7. Apparatus as set forth in claim 6 wherein said means to control the gain of said amplifier is responsive to the amplitude of said sum component.

8. Apparatus as set forth in claim 6 wherein said means to control the gain of said amplifier comprises a filter for blocking one of said components.

9. Apparatus as set forth in claim 6 wherein said amplifier includes at least one voltage sensitive variable impedance element whose impedance varies in response to the amplitude of one of said components.

References Cited

UNITED STATES PATENTS

| | | | |
|---|---|---|---|
| 2,958,768 | 11/1960 | Brauer | 325—17 |
| 3,209,271 | 9/1965 | Smith | 329—122 |
| 3,379,977 | 4/1968 | Osborne et al. | 325—417 |
| 3,413,554 | 11/1968 | Yates et al. | 325—17 |

RICHARD MURRAY, Primary Examiner

B. V. SAFOUREK, Assistant Examiner

U.S. Cl. X.R.

179—2.5; 325—17, 62, 409. 417; 329—50, 122, 131; 343—177